(12) United States Patent
Johnstone et al.

(10) Patent No.: US 6,738,459 B1
(45) Date of Patent: *May 18, 2004

(54) METHOD AND APPARATUS FOR EFFICIENTLY UTILIZING A COMMUNICATIONS INFRASTRUCTURE

(75) Inventors: Robert Patrick Johnstone, Flower Mound, TX (US); Robert H. Orr, Jr., Flower Mound, TX (US)

(73) Assignee: Verizon Corporate Services Group Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/255,398

(22) Filed: Sep. 26, 2002

Related U.S. Application Data

(63) Continuation of application No. 09/521,539, filed on Mar. 7, 2000.

(51) Int. Cl.[7] .............................................. H04M 15/00
(52) U.S. Cl. ........................ 379/114.01; 379/114.03; 379/114.05; 379/114.1; 379/114.12; 379/114.28; 379/121.02
(58) Field of Search ................. 379/114.01, 114.03, 379/114.05, 114.06, 114.07, 114.1, 114.12, 114.28, 115.01, 121.01, 121.02, 121.04, 121.05, 127.05, 207.02, 201.02, 112.01, 133, 134; 705/40, 1

(56) References Cited

U.S. PATENT DOCUMENTS

| | | | |
|---|---|---|---|
| 4,763,317 A | 8/1988 | Lehman et al. ............... 370/58 |
| 5,659,601 A | 8/1997 | Cheslog ....................... 455/406 |
| 5,915,006 A | 6/1999 | Jagadish et al. ............. 379/127 |
| 5,978,780 A | 11/1999 | Watson ........................ 705/40 |
| 6,052,447 A * | 4/2000 | Golden et al. ............ 379/114.1 |
| 6,069,947 A | 5/2000 | Evans et al. ................. 379/229 |
| 6,118,780 A | 9/2000 | Dunn et al. .................. 370/355 |
| 6,145,002 A | 11/2000 | Srinivasan ................... 709/225 |
| 6,173,046 B1 | 1/2001 | Jagadish et al. ............. 379/111 |
| 6,240,167 B1 | 5/2001 | Michaels ............... 379/106.03 |
| 6,282,519 B1 | 8/2001 | Peters et al. ................... 705/34 |
| 6,298,125 B1 * | 10/2001 | Goldberg et al. ......... 379/114.1 |
| 6,307,836 B1 | 10/2001 | Jones et al. .................. 370/230 |
| 6,337,901 B1 * | 1/2002 | Rome et al. ........... 379/112.01 |
| 6,512,821 B1 * | 1/2003 | Johnstone et al. ..... 379/114.01 |

* cited by examiner

Primary Examiner—Curtis Kuntz
Assistant Examiner—Quoc Tran
(74) Attorney, Agent, or Firm—Leonard C. Suchyta, Esq.; Joel Wall, Esq.

(57) ABSTRACT

A total aggregation plan (TAP) provides a plurality of data services to a Network Service Provider (NSP). The present invention encourages the NSP to use more than one type of telecommunications service to connect to its end-users (subscribers) by requiring that the NSP choose a specified number of data services that are available from the telephone company under the plan. The NSP is then required to sustain an annualized billing of greater than a specified amount and maintain at least a specified percentage of billing allocations to each one of the data services chosen. If the NSP does comply in this manner, then a billing credit is provided to the NSP based on the billing history.

20 Claims, 2 Drawing Sheets

US 6,738,459 B1

METHOD AND APPARATUS FOR EFFICIENTLY UTILIZING A COMMUNICATIONS INFRASTRUCTURE

RELATED INVENTION

The present invention is a continuation of "METHOD AND APPARATUS FOR EFFICIENTLY UTILIZING A COMMUNICATIONS INFRASTRUCTURE," U.S. patent application Ser. No. 09/521,539, filed Mar. 7, 2000, which is incorporated by reference herein.

BACKGROUND OF THE INVENTION

1. Technical Field

The present invention relates to telecommunications, and more particularly to a method and apparatus for providing aggregated data services to a network service provider.

2. Description of the Related Art

Numerous methods are currently used to connect a network service provider to an end-user by way of the vast telecommunications infrastructure that is currently in place. These methods of networking include dial modem aggregation, IP router aggregation, ADSL, frame relay, and ATM port with access line connections. In the past a network service provider would ordinarily choose one of these methods of connecting end-users or subscribers of the network service provider to the network service provider. Major telephone companies have put in place vast infrastructures to allow end-users to be connected to such a network service provider. However, although network service providers are making use of this infrastructure, there are certain portions that are not being utilized efficiently, and therefore, there is a need to encourage efficient utilization of this infrastructure. It would be desirable to encourage network service providers to use not just one form of providing data services to its end-subscribers, but to take advantage of multiple methods of communications which are currently available.

SUMMARY OF THE INVENTION

The current invention is a total aggregation plan (TAP) which connects an end-subscriber to a network service provider. The network services used for Internet Protocol (IP) packet traffic include ADSL, ATM, frame relay, dial modem, and IP routing. The service chosen by the Customer remains customizable in that the Customer can manage the dial modems and the IP routers and can choose the service which it prefers. By choosing a total aggregation plan, the Customer avoids multi-tariff enrollment for telecommunication services. In addition, the staff and expense to construct a dedicated IP network is avoided.

The present invention encourages Customers to use more than one type of data service to connect to its end-user (subscriber) by requiring that the Customer choose a specified number of data services that are available from the telephone company under the plan. The Customer is then required to sustain an annualized billing of greater than a threshold amount and maintain at least a specified percentage of billing allocations to each one of the data services chosen. If the Customer does comply in this manner, then a billing credit is provided to the Customer based on the billing history. Thus, the Customer is encouraged to use more than one of the data services offered by the Telephone Company. This in turn results in increased utilization of the telecommunications infrastructure while allowing more efficient billing for such service. The invention also provides freedom to intermix data services without having to maintain a specific unit count. Other than the minimum specified percentage billing allocations, the Customer is free to change the level of usage for each service provided. Furthermore, the present invention makes it easier for Customers to access markets beyond metropolitan areas because more primitive forms of data services may be chosen in the package.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION

The present invention, also called Total Aggregation Plan (TAP) service, is an end-to-end data "packaging" solution enabling Customers (ESP), also called Network Service Providers, the capability to provide their end-users ("subscribers") various Internet or network access services. These services range from Internet Protocol (IP) dial modem aggregation, Asynchronous Digital Subscriber Line (ADSL) access, Frame Relay access, Asynchronous Transfer Mode (ATM) access, and dedicated IP router access within the territory of the provider of TAP service (GTE, for example). The territory may be extended to a market area as the provider procures more facilities outside of its own territory. All of these services are individually well known by one of skill in the art. TAP includes simplified ordering, service internetworking, data aggregation and data delivery of various data service by means of a networking solution coordinated with the Customer. TAP service accommodates the requirements of Customers in providing Internet Protocol services to their subscribers.

Throughout this description, "Customer" is used to refer to one who pays directly for the TAP service described herein (the Network Service Provider), and "subscriber" is used to refer to an end user who subscribes to a network connection provided by the Customer through the TAP service. The networking of multiple data services gives the Customer the ability to concentrate and transport Internet Protocol (IP) Customer Designated Location (CDL) end points within a region, to one central TAP Broadband Access Point (BAP) for connectivity to the Customer's dedicated network. These CDL end points may be IP dial aggregation, IP router aggregation, ADSL, Frame Relay and ATM port with access line connections services. However, one skilled in the art will recognize that additional services may be offered without departing from the scope and spirit of the invention. These TAP services are provided by the Telephone Company in the most efficient manner to achieve the network coverage and connectivity requested by the Customer.

Figure 1:
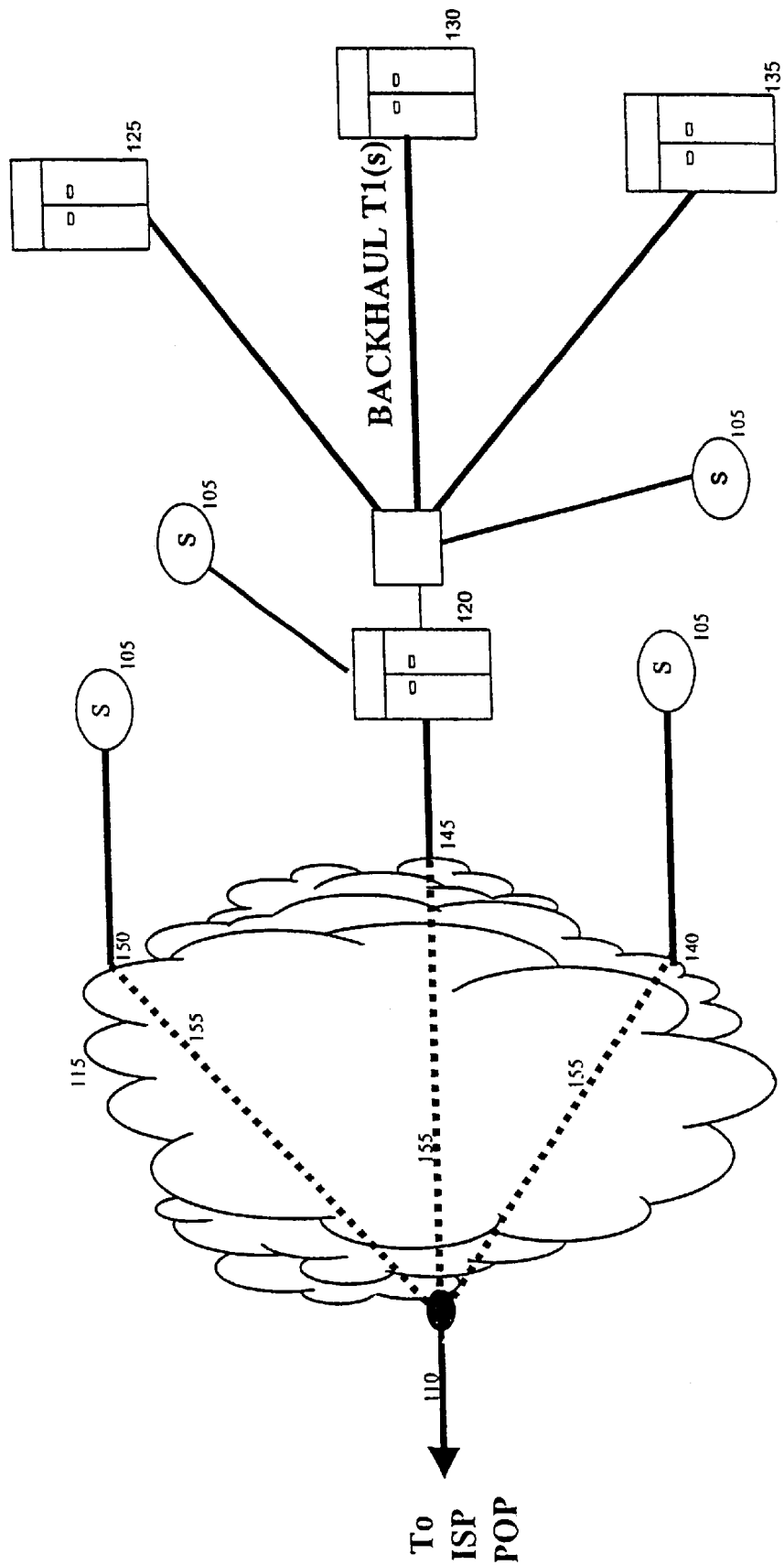
FIG. 1 is a schematic diagram of a preferred embodiment of the invention.

Referring now to FIG. 1, a schematic diagram of a preferred embodiment of the invention is illustrated. FIG. 1 illustrates the use of a shared network 115 to transport CDL endpoints 105, 125–135 to one central TAP Broadband Access Point (BAP) 110. All of the data services are multiplexed and sent to the NSP Point of Presence (POP), usually over a dedicated line. The shared network 115 may be an ATM or a Frame Relay type of network. Individual subscribers 105 that are connected to the shared network 115 may be connected using ADSL, frame relay, or IP Dial Modem. An IP router 120 channelized DS3 system is used to connect multiple modem banks 125, 130, 135 to the shared network 115. The connection between IP router 120 and shared network 115 may be made using an ATM port with access and a broadband access point. A multiplexor is used between the modem banks 125, 130, 135 to multiplex, for example, DS1 facilities onto a DS3 facility. The TAP BAP 110 is connected to the NSP Point of Presence (POP). This connection may be made using a dedicated DS3 line, for example. FIG. 1 is only an illustration of how the invention may be implemented in a particular market.

The BAP 110 is the aggregation point selected by the Customer, and designated by the Telephone Company, for connecting multiple serving wire centers to provide TAP services per a defined set of Frame Relay, ATM and/or IP Router network interfaces ordered as part of the TAP rate element offerings. The TAP ATM or IP Router egress BAP ports may be connected to other Telephone Company services, which may include, but are not limited to DS3, OC-3c, or OC-12c leased line facilities. Such a connection is necessary in order to connect the egress port to the Customer's core network. "Ingress" as used here refers to subscriber traffic entering the TAP network or, in other words, requesting access to the Customer network. "Egress" as used here refers to traffic leaving the TAP network cloud toward the Customer's core network. The TAP ingress services are comprised of various User Network Interface (UNI) ports 140, 145, 150 with local data access lines utilizing IP dial aggregation, IP router aggregation (port 145), ADSL, Frame Relay and/or ATM with specific PVC Quality of Service (QoS) connections.

A TAP UNI port with access line is a facility that provides the Customer's subscriber access from the subscriber's serving wire center to the physical TAP interface 140, 145, 150 on the Telephone Company's ATM, Frame Relay, or IP Router switch. TAP UNI ports with access lines may be obtained for digital special access lines with Frame Relay protocol in various bandwidth levels. For example, the digital special access line may be a DS1, DS3, OC3, or OC-12c transport facility which are capable of data rates of 1.5 Mbps, 4 Mbps, 155 Mbps, and 622 Mbps, respectively.

The Customer accesses TAP service via an egress TAP Broadband Access Point (UNI or NNI connection). "NNI" is a Network to Network Interface which is used to connect two private networks using similar technologies (e.g., ATM). The ingress TAP services is a UNI port with access line service only. This allows the provider of TAP service to be assured that the Customer receives the expected level of QoS. An IP Router may be connected to an ATM or Frame Relay network using a TAP IP Router BAP and matching TAP ATM or Frame Relay UNI port with access line service. The Customer may also utilize Telephone Company provided digital access facilities offered under Section 5 or SONET Access Service under Section 20 for market connectivity to the egress TAP Broadband Access Point.

If additional ATM and Frame Relay PVCs are ordered, these PVCs are billed separately per a monthly rate, irrespective of the enrolled TAP plan. PVCs are typically added when the Customer needs additional ports with which to connect additional subscribers. An Access Service Request (ASR) may be used for the programming and activation of PVCs. An ASR is the industry standard used to order federal tariffed services from a RBOC or LEC. If the sum of the port bandwidth utilized by existing and additional PVCs for CIR and VBR-nrt services exceeds the bandwidth allotted for these services within the subscribed bandwidth level for that port, then the Telephone Company may refuse to add additional PVCs. This is to prevent guaranteed data rates which are in excess of the bandwidth available for that switch port. Normally, a nonrecurring charge is assessed for establishing or rearranging a PVC. The Telephone Company may waive nonrecurring charges if the Customer contracts for service to TAP for a minimum period of time, for example, five years.

Each TAP UNI port with access line is further defined by its speed or bandwidth capability and throughput based on the originating protocol requested by the Customer. The actual throughput of Customer traffic cannot exceed the bandwidth of the access line and port speed. The Customer is responsible for purchasing an appropriate permanent virtual circuit (PVC) 155 to provide a connection between the subscriber and the BAP 110. PVC 155 defines a dedicated path across the UNI access line between the CDL and the BAP of the Customer.

TAP provides a Customer attractive pricing per data service in exchange for the Customer making billing commitments and teaming with Telephone Company to provide its data service needs according to the market. In addition to this attractive pricing, the Customer receives billing credits in exchange for having maintained a specified level of monthly recurring billing for a specified period of time. The credits are provided for eligible TAP services as defined by the Telephone Company.

In a preferred embodiment, the Customer chooses three (3) of five (5) categorized data services (i.e. dial aggregation, router aggregation, ADSL, ATM, and Frame Relay). Furthermore, the Customer must sustain an annual recurring billing greater than $1 Million and maintain at least a 5% billing allocation to each of the three selected TAP data services. The $1 Million annual billing is calculated by annualizing the last three months of historical monthly recurring charge billing. This is referred to generally as "scaling." Billing credit is provided to the Customer once the annualized billing reaches $1 Million. As the annualized billing reaches higher thresholds, the Customer can obtain a greater billing credit, as determined by agreement.

For example, if the Customer has annualized billings of $2 M, then a larger percentage may be used as a billing credit. Although five services are provided in the preferred embodiment described herein, one skilled in the art will recognize that a different number of categorized data services may be made available, and the Customer may be required to choose more or less than the (3) required in the preferred embodiment described herein. Also the amount of the annualized billing or volume threshold requirement may be modified without departing from the scope and spirit of the invention.

A BAP 110 may be implemented using ATM or IP Router protocol at a bandwidth agreed to by the Telephone Company and the Customer, typically DS3, OC-3c or OC-12c. Access to the TAP BAP may be provided via digital special access lines from Section 5 or SONET facilities from section 20. However, the associated regulations, rates, and charges from Section 5 and Section 20 apply in addition to the rates and charges associated with TAP service rate elements.

The ATM services may be provided based on the Customer's selected speed for the Sustained Cell Rate (SCR) and Peak Cell Rate (PCR). SCR is the maximum average cell transmission rate on a given PVC. The PCR is the maximum cell transmission rate (cells per second) per PVC. ATM may be based on the Sustained Cell Rate to allow the network to allocate sufficient network resources to guarantee network performance objectives.

The TAP Frame Relay services are provided based on the Customer's selected speed of the committed information rate (CIR) and maximum Burst Rate (Be) of the PVC. CIR is the minimum guaranteed rate of throughput on the PVC. Since multiple PVCs may be defined on one physical port (e.g., a DS1, DS3, OC-3c, or OC-12c line), the cumulative CIR is limited by the physical bandwidth of that port. The path is set up by the Telephone Company based on information from the Customer, which is submitted on an Access Service Request (ASR). No PVC can have a CIR bit rate greater than the lower of the speeds of the ports connected by a PVC segment. A monthly recurring charge and a nonrecurring charge based upon the CIR capacity (for Frame Relay) and the Sustained Cell Rate (for ATM) is applied for each additional PVC ordered for a TAP port with access Line service.

TAP ADSL service is provided over existing Telephone Company copper facilities and transported to the Telephone Company's backbone network. ADSL service provides a connection from the Customer designated location (CDL) to the designated TAP ingress connection. Access from the Telephone Company's TAP ADSL ingress connection may be provided via Frame Relay or ATM Network Service, where facilities permit. The TAP connecting service should have sufficient bandwidth in order to take advantage of the maximum speed of the ADSL service(s) being provided.

The Telephone Company may require qualification of the ADSL Service between the subscriber and the serving wire center. The purpose of qualification is to determine the availability and suitability of existing Telephone Company copper facilities to provide the service. Obviously, ADSL service cannot be provided on facilities which are not suitable for ADSL. Thus, ADSL is typically provided subject to the availability and limitations of the Telephone Company wire centers and outside plant facilities. Downstream data rates depend on a number of factors, including, but not limited to (1) the distance from the subscriber to the serving wire center, (2) the type of copper facility (wire gauge), and (3) the physical plant.

A nonrecurring charge and a monthly rate is typically applied for the installation of TAP ADSL Service(s), regardless of the TAP plan in which the Customer enrolls. ADSL service is currently available in multiple service level packages, and is based on the "downstream and upstream" speeds chosen by the Customer. For example, GTE provides multiple service levels: Bronze Plus, Silver, Gold, Platinum, and Platinum Plus, each having a different rate. The Customer may have multiple ADSL packages, but the downstream and upstream speeds are typically not substituted within a service level because the packages are generally defined by the downstream and upstream speeds as shown in the table below:

|  | Downstream | Upstream |
| --- | --- | --- |
| Bronze Plus | 768 Kbps | 128 Kbps |
| Silver | 384 Kbps | 384 Kbps |
| Gold | 768 Kbps | 768 Kbps |
| Platinum | 1.5 Mbps | 768 Kbps |
| Platinum Plus | 1.5 Mbps | 768 Mbps |

Data speeds set forth above are peak speeds for GTE ADSL service. However, loop distance and other factors may affect actual speeds.

IP dial modem aggregation service may be ordered per central office at a specified minimum number of modem port channels, for example, a 48-modem minimum. This number may be increased incrementally, for example, by 24 modems, as the needs of the Customer increase. The IP dial modem aggregation service of a preferred embodiment includes local back-haul connectivity to the TAP BAP. This back-haul connectivity may be provided by either Frame Relay T1 or IP Router T1, depending on the equipment available in the TAP market selected by the Customer.

In a preferred embodiment, the Telephone Company provides and maintains TAP service for the Customer up to and including the Network Interface Device (NID). The NID is the device used as the demarcation of the service provided to the subscriber. This NID is also called the hand-off point. The Telephone Company will typically advise the Customer of the equipment necessary to support ADSL service, if such service is chosen by the Customer.

The dedicated equipment provided within the Telephone Company's serving wire center (commonly called a central office) to provide IP dial modem aggregation and IP Routing aggregation may be selected at the discretion of the Telephone Company. Customer requests regarding the configuration and design of the equipment may be considered by the Telephone Company and incorporated into the equipment selection when possible. In this manner, a customizable solution is provided to the Customer.

Upon subscribing to TAP service, the Customer typically specifies the maximum amount of uncommitted data (Burst Rate or Be) for each Frame Relay port ordered and the maximum cell transmission rate (PCR) of the PVC for each ATM port ordered. For ADSL service, the Customer provides the maximum cell transmission rate Telephone Company with the necessary information (e.g. Data Link Connection Identifier(s) (DLCI), Permanent Virtual Circuit (PVC) and/or Internet Protocol) to provide ADSL service. The Customer ordering ADSL service on behalf of its subscriber(s) may also obtain a letter of agency from the subscriber. Furthermore, the Customer is typically responsible for obtaining permission for the Telephone Company's agents or employees to enter the premises of the subscriber or its users at any reasonable hour for the purpose of installing, inspecting, repairing, or upon termination of the service, removing the service components of the Telephone Company. The Customer also generally maintains software configuration, software management, and authentication control for the TAP IP dial and IP router aggregation service(s). When Customer acceptance testing has been completed in regards to dedicated IP dial and IP router equipment placement, the Customer typically notifies the Telephone Company.

In a preferred embodiment, the minimum period for TAP service is three (3) years, and the billing commences on the date of service completion or the $60^{th}$ calendar day following the date of the Telephone Company's notification to the Customer of site completion, whichever is sooner. Site completion typically refers to IP dial modem or IP router platform placement. In an alternate embodiment, the minimum period is 5 years wherein larger percentage billing credits are given to the Customer than is given under the 3 year plan.

The TAP Broadband Access Point may be an ATM or IP Router port service that is available at a 3-year or 5-year rate.

The TAP BAP serves as the point at which egress traffic is directed. An IP Router BAP may be utilized to facilitate connectivity of the Telephone Company's ATM or Frame Relay network to permit other TAP port with access line services to be provided.

Figure 2:
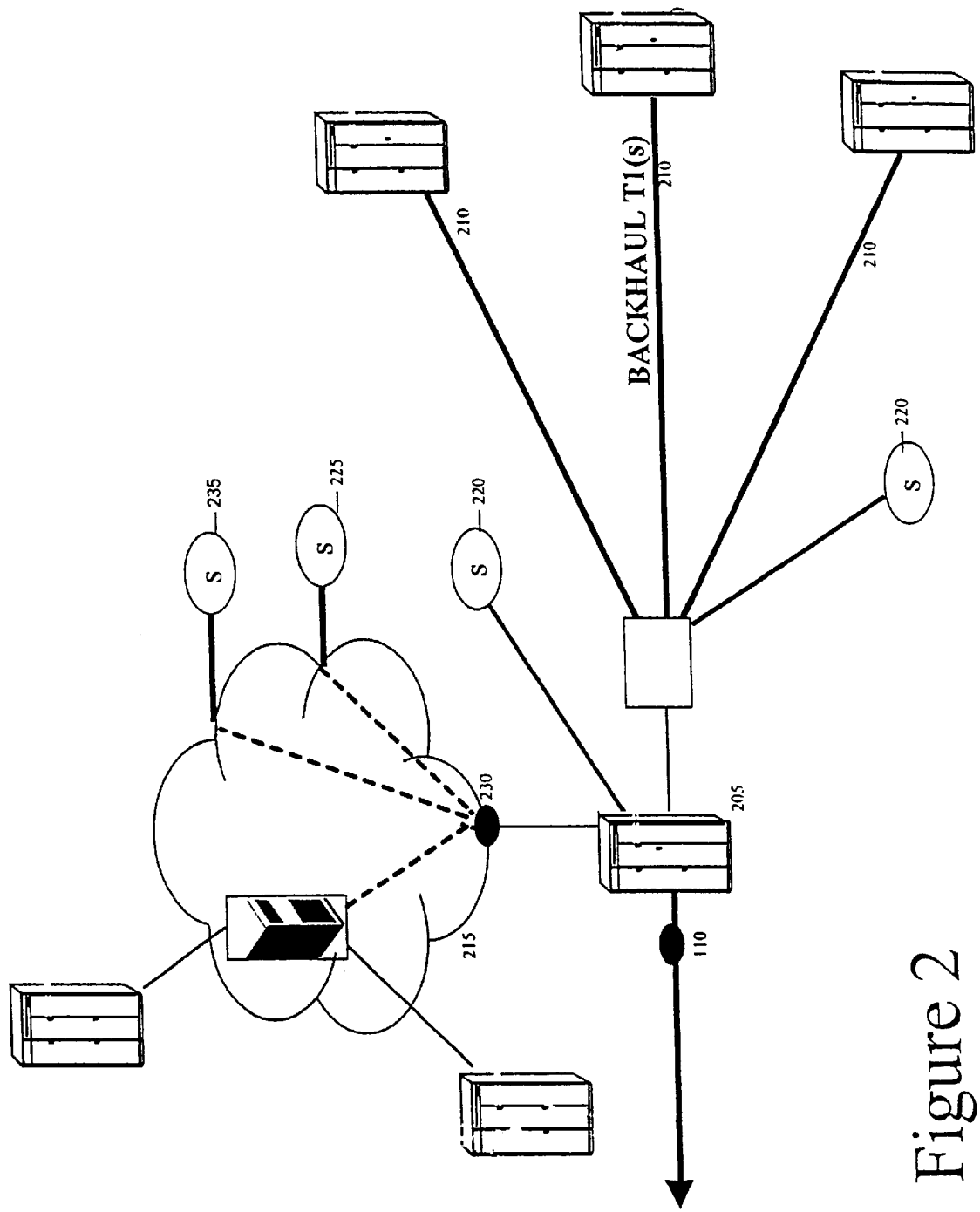
FIG. 2 is a schematic diagram of another preferred embodiment of the present invention.

Referring now to FIG. 2, a preferred embodiment of the present invention is illustrated. FIG. 2 illustrates a market in which the invention may be implemented where the Customer desires for the BAP to be connected to an IP router. Thus, a high end IP Router 205 is used to provide a broadband access point 110. The high-end IP Router 205 is not only connected directly to subscribers and backhaul T1 lines 210, but may also be connected to Frame Relay 215 by way of a dedicated line such as a DS3 line which provides a frame interlink to the high-end IP Router 205. In this manner, the ATM or frame relay network 215 may be used to permit other TAP ports with access line services to be provided. In effect, another BAP 230 is provided in order to provide connectivity with the ATM or Frame Relay Network 215. For example, subscriber 235 may be connected to Frame Relay or ATM 215 by way of an ADSL line. Subscriber 225, on the other hand, may be connected by way of a Frame Relay connection. A PVC is then purchased to connect the ADSL or Frame Relay connection to the Frame Relay port with access connection to the high-end IP Router 205. A monthly rate, based on the bandwidth level of the port connection (i.e. DS3, OC-3c, OC-12c), will apply per port for each digital special access line or SONET connection to the network supporting TAP service. This configuration is used for connecting two networks together for bi-directional messaging. Each port can accommodate multiple PVCS. Egress access facilities are available from Section 5 and SONET from Section 20.

The Telephone Company's billing system is used to determine at each review if the Customer's billing is allocated across at least the minimum number of the TAP services categories in a specified percentage for each category. For example, if at least 3 TAP services are specified, then the billing system determines if a minimum billing of 5% per each of three categories has been obtained and also determines if a billing credit should to be applied based on volume tier and term commitment. The monthly billing credit is provided as soon as the Customer has reached the threshold billing of $1 M annualized. In one embodiment of the invention, the billing credit is determined in the following manner:

1) If the calculated annualized billing amount remains over the $1 M threshold, the appropriate credit is given each month based on the term commitment and volume billing at the time of the review. If the billing falls below the 1M, then no credit is given. (See Billing Volume Threshold Table.)

2) The credit amount, and calculation appears on the Customer Service Record (CSR) with each individual TAP Universal Service Order Code (USOC).

3) The billing credit volume tier is determined by totaling the last 3 months total billing and multiplying by 4. This is the annualized billing amount that determines the applicable billing credit percentage based on the volume tier.

4) After each review, the billing credit percentage is determined and stored within the system. This billing credit percentage is applied to all billing for that Customer until the next review.

5) If an Customer exceeds the minimum annual commitment of $1 M and is in a higher volume tier, and if this Customer maintains 95% of the tier minimum volume, the billing credit percentage remains that of the higher, previously attained tier.

6) If the Customer billing drops below 95% of the previously attained tier, then the billing credit percentage of the current volume tier is applied to the Customer bill until the next review period.

In a preferred embodiment, a shortfall charge is applied if the Customer's monthly TAP billing is below $1/12^{th}$ of $1 M and/or below the annualized $1 M after a ramp-up period. This shortfall debit adjustment is equal to the difference between the threshold volume and the volume attained, plus 10% of the difference. This calculated amount is held until the next month. For example, if the threshold volume is $83,333.33 ($1/12^{th}$ of $1 M), and the volume obtained is $65,000, then the shortfall debit adjustment is $20,166.66. If the volume attained for the next month is still below the threshold, then the shortfall for the previous month is billed.

The following table contains the billing volume plan thresholds for a preferred embodiment of the invention:

| VOLUME BANDS | BILLING CREDITS APPLIED | |
| --- | --- | --- |
| (Total Annual TAP Billing) | 3-Year TAP Plan | 5-Year TAP Plan |
| $1 M to $3 M | 1% | 2% |
| >$3 M to $6 M | 2% | 4% |
| >$6 M to $9 M | 3% | 6% |
| >$9 M and higher | 4% | 8% |

When the Customer elects to enroll in the TAP, the Customer specifies in writing either a 3-year or a 5-year rate plan selection and the enrollment date (which is also the anniversary date). As illustrated in the table above, a larger percentage billing credit is applied for the 5-year TAP plan. The specified enrollment date should be within 90 days from receipt of the written enrollment request and be a date between 1 and 28, to avoid leap year problems. The Customer also specifies the TAP market(s) to be included within the TAP plan. The Customer must identify the Access Customer Name Abbreviations (ACNAs) or Billing Account Numbers (BANs) that are associated to the TAP Plan. ACNAs and BANs are used to identify the Customer on each service order and within the ordering database. This facilitates the consolidation of billing information. By the enrollment date, TAP networking ASRs should be issued to provide the appropriate networking of central office elements and/or convert existing services to fall within the TAP Billing Volume commitment and term.

The TAP effective service date is negotiated by the Telephone Company and Customer. Credits begin with the first billing period following the first three month review after the negotiated service date of the TAP service, provided that annualized billing thresholds have been reached at the time of the review.

An implementation period not to exceed six months for the 3-year rate plan and one year for the 5-year rate plan may be negotiated between the Telephone Company and Customer. This gives the Customer a grace period within which it is not penalized for failing to reach the agreed volume threshold.

When the Customer subscribes to the TAP service, the billing credit is determined based on four times the Customer's most recent three months billing (historical billing). This gives the annualized billing for the Customer. The Customer agrees to maintain a commitment level of billing or greater for the duration of their TAP services. If the Customer is exceeding the minimum annualized commitment and is in a higher volume tier, and if the Customer maintains at least 95% of the tier minimum volume, the Customer's billing credit remains that of the higher, previously attained billing credit tier. If the billing volume drops below 95% of the previously attained tier, then the billing credit percentage of the current volume tier is applied to the Customer bill until the next review period.

Each Customer's service commitment is reviewed monthly beginning at the first three-month period following enrollment. The Customer is notified in writing as to the status of the commitment requirements. This notification informs the Customer of any shortfall or volume thresholds reached. At the review, if the total billing volume in-service does not meet the minimum required by the TAP plan selected, given no fault of the Telephone Company, shortfall charges are applied in the following manner:

1) The shortfall is billed to the account(s) selected by the Customer. However, the shortfall amount is held without being billed for one month. If a review during the next month shows that the Customer billing is still below the minimal threshold, the shortfall amount is sent to billing system to be billed as a billing adjustment the next time the selected account bills.
2) The shortfall adjustment amount is spread across all TAP services billing in proportion to the percentage of total billing by each service.
3) The shortfall billing is discontinued as soon as the annualized minimum billing is again attained.
4) Shortfall charges may be waived for the first review after the ramp-up period or if the Telephone Company is found at fault in providing services.
5) Account Management for the Customer is notified that the Customer is not meeting the annualized commitment. This notification report is sent to an EMAIL ID established by Account Management.

To discontinue a TAP service, an ASR is sent to the Telephone Company at least thirty (30) days prior to actual disconnects of service. Recurring charges still apply for a period of thirty (30) days from the date the Telephone Company receives disconnect notification or until the requested disconnect date, whichever period is longer. The Customer may elect to upgrade service(s) to a higher speed during a TAP period.: The upgrade service is subject to all appropriate charges in addition to the following conditions:

1) Both the existing and the new services must be provided solely by the Telephone Company.
2) The order to discontinue a service at an existing speed or capacity and the order for the upgraded service should be sent to the Telephone Company at the same time.
3) The new service must be provided at the same Customer Designated Location(s) as the discontinued service.
4) The higher speed term commitment must be equal to or longer than the time remaining under the TAP.
5) The total monthly rate of the new agreement must be equal to or greater than the total monthly rate of the existing agreement.
6) The monthly rates for the upgraded service(s) and/or service elements are those in effect at the time of the service upgrade. The upgraded service is subject to all appropriate nonrecurring charges.
7) Termination liability charges do not apply as long as the upgraded service remains connected at the same point of termination(s).

When any TAP service (i.e., an individual service element under the plan) is discontinued prior to the end of the commitment period, termination liability charges apply based on the remainder of the TAP period in effect at the time of disconnect. The termination liability is also applicable to the TAP Broadband Access Point. However, termination liability typically does not apply to PVCs because PVCs are provided as a monthly service.

For example, for a three-year TAP, the termination liability charges include 50% of any remaining portion of the first year's recurring charges. In addition, for any remaining portion of the second and third years, the Customer is liable for 5% of the total monthly recurring charges in that time period. For a five-year TAP, the termination liability charges include 50% of any remaining portion of the first year's recurring charges. In addition, for any remaining portion of the second through fifth years, the Customer is liable for 5% of the total monthly recurring charges in that time period.

If the Customer terminates the plan when there has been no monthly rate increase by the Telephone Company, the Customer is assessed 75% of $1/12^{th}$ of $1M for the remaining months of the enrollment plan. This liability is applicable irrespective of any service terminations. However, if the monthly rate for a Customer's TAP service increases due to Telephone Company action, the Customer may terminate the subscription without penalty or liability. Termination liability is not assessed to services that are migrated from the TAP service offering to another Telephone Company service offering. The Telephone Company's rates for another service offering are applicable at time of migration.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention the practical application to enable others of ordinary skill in the art to understand the invention for various embodiments with various modifications as are suited to the particular use contemplated. For example, the time periods may be changed; the threshold values may be changed; the procedures for termination and startup can be changed; and the percentage billing credit may be changed, all without departing from the scope and spirit of the invention.

What is claimed is:

1. A method for efficiently utilizing a telecommunications infrastructure, said method comprising the following steps:

(a) selecting a plurality of services to be aggregated into a service plan;

(b) providing said plurality of services to a Network Service Provider for enabling said Network Service Provider to provide said plurality of services to end-users of said Network Service Provider;

(c) requiring said Network Service Provider to maintain a minimum billing allocation for each of said plurality of services;

(d) determining a billing credit based on a billing history of said Network Service Provider, wherein if said billing history indicates that a scaled volume attained by said Network Service Provider is at least as great as a threshold volume, then said billing credit is equal to a percentage of a volume attained; and (e) applying said billing credit to an amount due on a current bill of a billing account for said Network Service Provider.

2. The method of claim 1 wherein said step (a) comprises the step of choosing said plurality of services from a group of data services offered by a telephone company, said choosing step being performed by said Network Service Provider.

3. The method of claim 2 wherein a rate billed for each of said plurality of services is determined in response to a type of said each of said plurality of services chosen from said group of data services.

4. The method of claim 1 further comprising the step of providing said plurality of services to a broadband access point selected by said Network Service Provider.

5. The method of claim 4 further comprising the step of providing a plurality of private virtual connections between said broadband access point and a plurality of locations designated by said Network Service Provider.

6. The method of claim 4 further comprising the step of providing a dedicated line between said broadband access point and a point of presence of said Network Service Provider.

7. The method of claim 1 further comprising the step of applying a shortfall charge to said billing account of said Network Service Provider if said scaled volume is less than said threshold volume.

8. The method of claim 1 wherein said threshold volume comprises a plurality of threshold levels wherein said percentage applied as said billing credit is increased as higher ones of said plurality of threshold levels are attained by said Network Service Provider.

9. The method of claim 1 wherein said scaled volume is an annualized volume.

10. The method of claim 1 wherein said step (a) further comprises the step of selecting said plurality of services from a group consisting of asymmetric digital subscriber line service, asynchronous transfer mode service, frame relay service, internet protocol router service, and dial modem service.

11. An apparatus for providing a plurality of data services to a Network Service Provider, said apparatus comprising:
 (a) means for providing said plurality of data services to said Network Service Provider wherein all of said plurality of data services converge at a single broadband access point selected by said Network Service Provider;
 (b) means for connecting a plurality of end-users of said Network Service Provider to said plurality of data services;
 (c) means for billing said Network Service Provider for said plurality of data services wherein a rate billed for each of said plurality of data services is determined in response to a type of said each of said plurality of data services selected;
 (d) means for determining a billing credit based on a billing history of said Network Service Provider, wherein if said billing history indicates that a scaled volume attained by said Network Service Provider is at least as great as a threshold volume, then said billing credit is equal to a percentage of a volume attained; and
 (e) means for applying said billing credit to an amount due on a current bill of a billing account for said Network Service Provider.

12. The apparatus of claim 11 further comprising:
 (f) means for selecting said plurality of data services to be aggregated into a service plan.

13. The apparatus of claim 12 further comprising:
 (g) means for designating a plurality of locations for termination of said plurality of data services.

14. The apparatus of claim 11 further comprising:
 (f) means for applying a shortfall charge to said billing account of said Network Service Provider if said scaled volume is less than said threshold volume.

15. A method for enabling a Network Service Provider to provide a plurality of data services to end-users of said Network Service Provider, said method comprising the steps of:
 (a) selecting said plurality of data services to be aggregated into a service plan;
 (b) providing said plurality of data services to said Network Service Provider, said step (b) including:
  (b1) providing a plurality of private virtual connections between a broadband access point selected by said Network Service Provider and a plurality of locations designated by said Network Service provider for connection to said end-users, wherein all of said plurality of data services converge at said broadband access point;
  (b2) providing a dedicated line between said broadband access point and a point of presence of said Network Service Provider for enabling connectivity of said end-users to a dedicated network of said Network Service Provider;
 (c) requiring said Network Service Provider to maintain a minimum billing allocation for each of said plurality of data services;
 (d) determining a billing credit based on a billing history of said Network Service Provider, wherein if said billing history indicates that a scaled volume attained by said Network Service Provider is at least as great as a threshold volume, then said billing credit is equal to a percentage of a volume attained; and
 (e) applying said billing credit to an amount due on a current bill of a billing account for said Network Service Provider.

16. A method for facilitating an efficient utilization of a telecommunications infrastructure, said method comprising the following steps:
 (a) selecting a plurality of services to be aggregated into a service plan;
 (b) providing said plurality of services to a Network Service Provider for enabling said Network Service Provider to provide said plurality of services to end-users of said Network Service Provider;
 (c) defining a minimum billing allocation for each of said plurality of services;
 (d) determining a billing credit based on a billing history of said Network Service Provider, wherein if said billing history indicates that an annualized volume attained by said Network Service Provider is at least as great as a threshold volume, then said billing credit is equal to a percentage of a volume attained; and
 (e) when a billing allocation for said each of said plurality of services is at least said minimum billing allocation and said annualized volume is at least as great as said threshold volume, applying said billing credit to an amount due on a current bill of a billing account for said Network Service Provider.

17. The method of claim 16 further comprising the step of applying a shortfall charge to said billing account if said annualized volume is less than said threshold volume.

18. The method of claim 16 wherein said threshold volume comprises a plurality of threshold levels wherein said percentage applied as said billing credit is increased as higher ones of said plurality of threshold levels are attained by said Network Service Provider.

19. The method of claim 16 wherein said percentage applied as said billing credit is determined in response to a term commitment of said service plan by said Network Service Provider, wherein said percentage applied as said billing credit is higher for a longer duration of said term commitment than a shorter duration of said term commitment.

20. The method of claim 16 wherein:

said step (a) comprises the step of choosing said plurality of services from a group of data services offered by a telephone company, said choosing step being performed by said Network Service Provider, and said group of data services including asymmetric digital subscriber line service, asynchronous transfer mode service, frame relay service, internet protocol router service, and dial modem service; and determining a rate billed for each of said plurality of services in response to a type of said each of said plurality of services chosen from said group of data services.

* * * * *